(12) United States Patent
Hartl

(10) Patent No.: US 8,013,260 B2
(45) Date of Patent: Sep. 6, 2011

(54) ELECTRICAL BUSHING, PRESSURE APPLICATIONS, AND METHOD FOR MANUFACTURING SUCH A BUSHING

(75) Inventor: Helmut Hartl, Vienna (AT)

(73) Assignee: BC Tech Holding AG, Chur (CH)

( * ) Notice: Subject to any disclaimer, the term of this patent is extended or adjusted under 35 U.S.C. 154(b) by 155 days.

(21) Appl. No.: 12/311,744

(22) PCT Filed: Jul. 4, 2007

(86) PCT No.: PCT/IB2007/001987
§ 371 (c)(1),
(2), (4) Date: Apr. 10, 2009

(87) PCT Pub. No.: WO2008/044105
PCT Pub. Date: Apr. 17, 2005

(65) Prior Publication Data
US 2010/0025104 A1  Feb. 4, 2010

(30) Foreign Application Priority Data

Oct. 10, 2006 (DE) .................. 10 2006 048 151
Nov. 20, 2006 (DE) .................. 10 2006 054 843
Feb. 15, 2007 (DE) .................. 10 2007 007 498

(51) Int. Cl.
*H02G 3/18* (2006.01)

(52) U.S. Cl. ............ 174/650; 174/667; 174/152 R; 174/35 GC; 439/110

(58) Field of Classification Search .......... 174/650, 174/152 R, 35 R, 35 GC, 152 G, 667; 439/98, 439/110
See application file for complete search history.

(56) References Cited

U.S. PATENT DOCUMENTS 3,775,547 A * 11/1973 Woods .............. 174/152 R
2009/0032283 A1 * 2/2009 Sjoberg et al. ....... 174/152 R FOREIGN PATENT DOCUMENTS
DE    37 20 061 A1    12/1988
* cited by examiner Primary Examiner — Dhirubhai R Patel
(74) Attorney, Agent, or Firm — Welsh Flaxman & Gitler LLC

(57) ABSTRACT

Electrical bushing, in particular for pressure applications, with a housing with at least one housing passage and with at least one electrical conductor, which is passed through the housing passage, protrudes at both ends on two housing sides, which are spaced apart from one another, out of in each case one opening of the housing passage out of the housing and is fixed in the housing by means of a tightly sealing material which fills at least the majority of the housing passage.

34 Claims, 3 Drawing Sheets

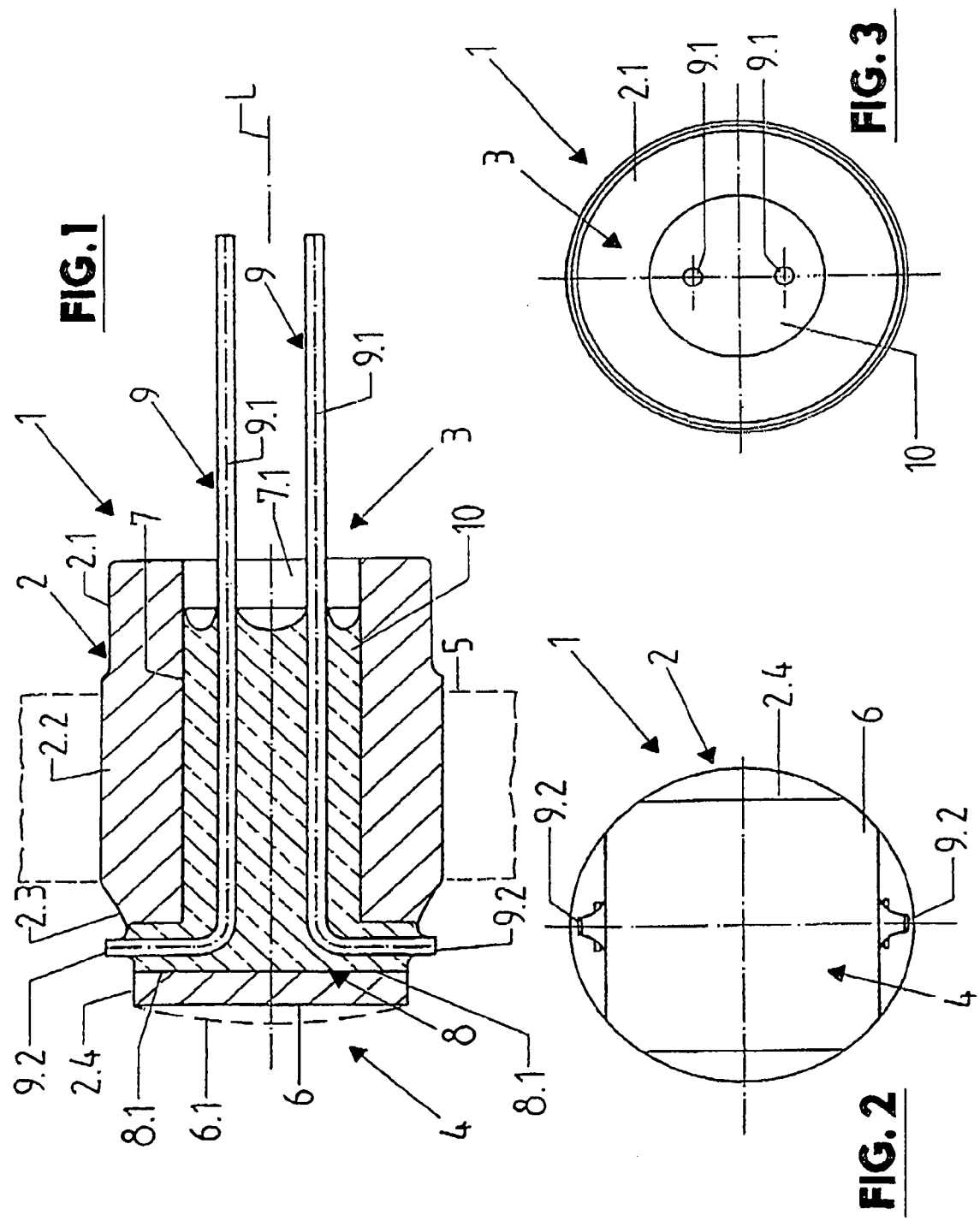

ELECTRICAL BUSHING, PRESSURE APPLICATIONS, AND METHOD FOR MANUFACTURING SUCH A BUSHING

BACKGROUND OF THE INVENTION

The invention relates to an electrical bushing or to an electric feedthrough and to a method for manufacturing such a bushing.

Electrical bushings, also embodied as glass/metal feedthroughs, are known in the art and are used for example to establish an electrical connection between two separate spaces, in which different conditions exist with respect to pressure, temperature, atmosphere or with respect to other media filling the spaces.

Especially in pressure applications, in which there is a high difference in pressure between the housing sides from which the electrical conductors of the feedthroughs extend, the material (glass body) fastening the conductor in the housings and sealing the housing passages, and also the transition of this material and the respective housing itself are subjected to high mechanical loads. This applies in particular to applications with changing pressures.

It is an object of the invention is to present an electrical bushing or an electric feedthrough that is suitable for pressure applications also at extremely high pressures.

SUMMARY OF THE INVENTION

A special feature of the invention is that the housing passage, at least in the proximity of a first housing end, which in the use case is the housing side subjected to pressure (hereinafter also referred to as the pressure-loaded side or pressure side), forms at least two openings on a section of the housing's outer surface to enclose a housing axis in the manner of a circumferential surface. The at least two openings are preferably equal in area or essentially equal in area. Further, the at least two openings are offset at regular angle distances around the housing axis, preferably so that the axes of the openings and therefore also the lines of force of the forces resulting form the pressure on the pressure side intersect in a common point, preferably together with the housing axis.

In pressure applications, this design results in compensation of the pressure forces acting on the openings in the proximity of the first or pressure-side housing end, in particular also so that forces resulting from the pressure of the pressure application and acting on the material sealing the housing passage in the direction between the first and the second housing end, i.e. for example in the direction of the housing axis, are prevented at least to a large extent, in particular also forces or loads at the transition area between the material sealing the housing passage and the housing.

According to the invention, a section of the housing's outer surface that seals the housing axis in the manner of a circumferential surface is any rotationally symmetric circumferential section formed around the housing axis, e.g. a cylindrical, conical section, but also a circumferential section on which the housing's outer or circumferential surface is polygonal in shape, for example having a triangular, rectangular, square or polygonal cross section. The essential aspect here is that the lines of force of the forces resulting from the pressure of the pressure application and acting on the passage openings intersect in a common point, therefore achieving compensation of the forces.

BRIEF DESCRIPTION OF THE DRAWINGS

The invention is described in more detail below based on an exemplary embodiment with reference to the drawings, in which:

FIG. 1 is a simplified representation in longitudinal section of a bushing or feedthrough according to the invention embodied as a metal/glass bushing or feedthrough;

FIGS. 2 & 3 show the metal/glass bushing of FIG. 1 in front view (FIG. 2) and in rear view (FIG. 3);

DETAILED DESCRIPTION OF THE INVENTION

Figure 4:
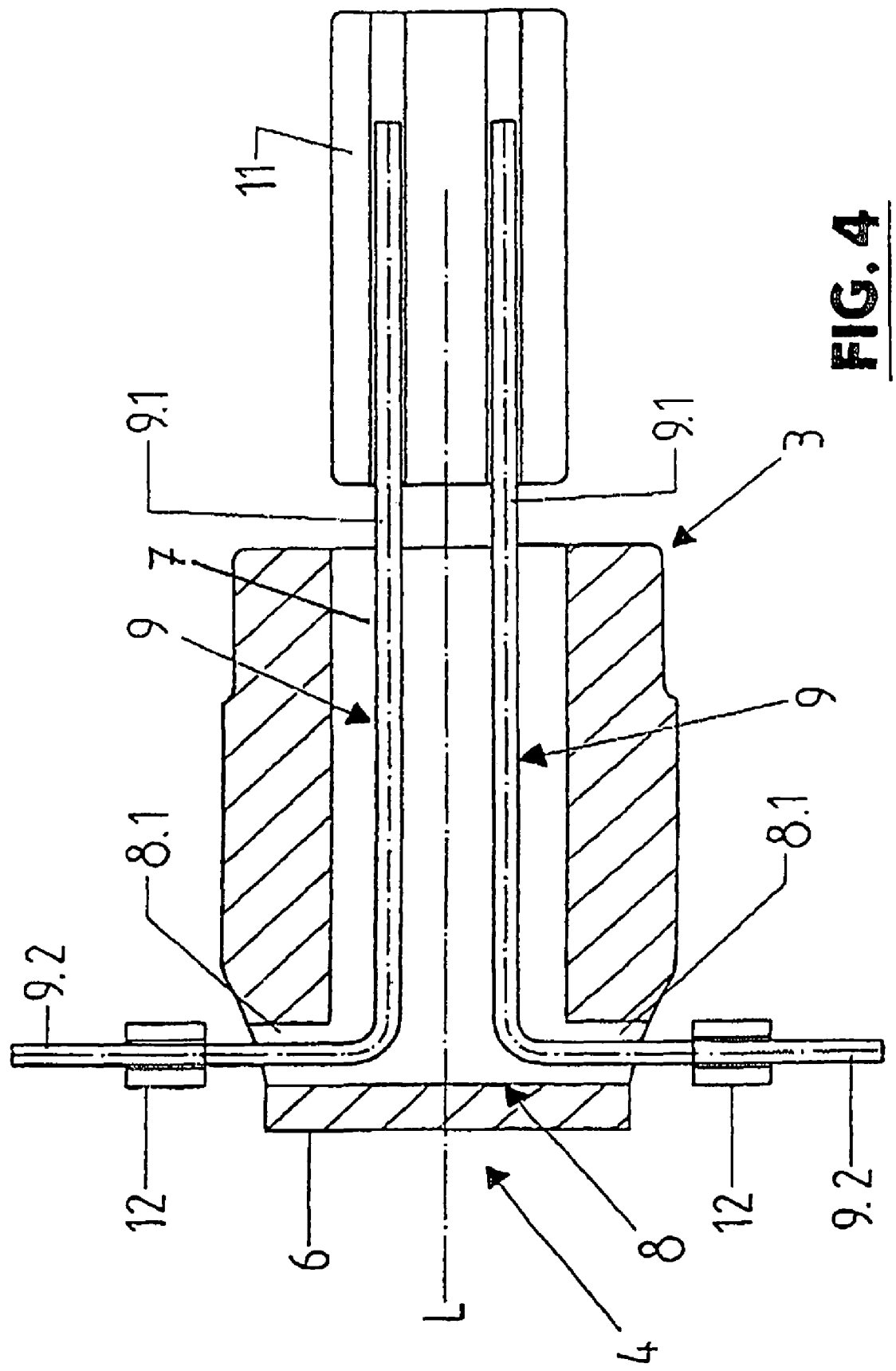
FIG. 4 shows in a representation similar to FIG. 1 the components forming the metal/glass bushing prior to manufacture of the bushing.

The bushing which is generally designated 1 in the drawings and is embodied as a metal/glass bushing is especially suited for high-pressure applications, for example for the electrical connection of electrical components located in a pressurized space, such as actuators, sensors, etc., with electrical components or assemblies located outside of the pressurized space, where the pressure in the pressurized space is, for example, the pressure of at least one liquid, gaseous and/or vaporous medium and which is several 1000 bar, while the pressure outside of the pressurized space is the ambient pressure, which is a pressure of approximately 1 bar. The bushing 1 can be used, for example, as a bushing or base for or as part of high-pressure sensors, e.g. in fuel injection systems or hydraulic systems.

The bushing consists in particular of a housing 2 made of metal, for example of steel, which in the depicted embodiment is designed as one piece with several housing sections 2.1-2.4, which starting from a back side 3 of the bushing 1 join one another in a longitudinal housing direction L toward the front side 4 of the bushing 1. On the housing section 2.1 directly adjacent to the back side 3 and on the adjoining housing section 2.2 the housing 2 in the depicted embodiment comprises a cylindrical circumferential surface, respectively, where the housing section 2.2 can be provided with an external thread, for example. Adjacent to the housing section 2.2 the external housing surface on the housing section 2.3 is conically tapered and then transforms into the housing section 2.4, on which the housing 2 in the depicted embodiment has a square cross section with rounded corner areas (FIG. 2) and which forms the front side 4 of the bushing. With the housing section 2.2 the bushing 1 can be fastened by being screwed into a component 5 forming the pressurized space and separating the latter for example from the surrounding environment. Other types of fastening methods are also conceivable, for example welding, brazing, etc. In the depicted embodiment the housing section 2.4 forms a flat or essentially flat front surface 6, which lies in a plane perpendicular to the longitudinal housing axis L and which is suitable for fastening electrical or electromagnetic components or assemblies.

The housing 2 is provided with a bore hole 7 executed on the same axis as the longitudinal housing axis L, which (bore hole) is open on the back side 3 and closed on the front side 4, i.e. it extends through the housing section 2.1-2.3, but not through the housing section 2.4. In the housing section 2.3 there is a transverse bore hole 8, the cross section of which is smaller than the cross section of the longitudinal bore hole (7) and the axis of which intersects the longitudinal housing axis L. The transverse bore hole therefore forms two bore hole sections 8.1, which are open on the outer surface of the housing section 2.3 respectively, and which open into the longitudinal bore hole 7 and the axes of which are oriented on the same axis with respect to one another and also radially to the longitudinal housing axis L.

Two conductors 9 formed respectively by a conductor or wire made of an electrically conductive material are fed through the longitudinal bore hole 7 and the bore hole sections 8.1, so that each conductor 9 protrudes with the end of a conductor section 9.1 over the back side 3 and with the end of a conductor section 9.2 radially and on the same axis as the axis of the respective bore hole section 8.1 beyond the circumference of the housing section 2.3. For this purpose, the two conductors 9 are bent at a right angle respectively within the housing 2 and otherwise are arranged in the depicted embodiment so that the conductor sections 9.1 lie with their axes in a common plane enclosing also the longitudinal housing axis L, and the conductor sections 9.2 lie with their axes in a common plane oriented perpendicular to the longitudinal housing axis L.

For mechanical fastening of the conductors 9 in the housing 2, for electrical insulation of the conductors 9 from each other and from the housing 2 and for sealing the housing at the bore holes 7 and 8, a glass body 10 is provided in the housing in which (glass body) the conductors 9 are embedded and which completely fills the bore hole sections 8.1 and the bore hole 7 with the exception of a relatively short section 7.1 on the back side 3.

The glass body 10 is manufactured as shown in FIG. 4 using three glass beads 11 and 12. The glass bead 11, which is approximately cylindrical on its circumferential surface and is adapted to the diameter of the longitudinal bore hole 7, is inserted into the longitudinal bore hole 7 and pushed with two continuous bore holes onto the conductor sections 9.1. The glass beads 12, which are approximately cylindrical on their respective circumferential surface and are adapted to the diameter of the transverse bore hole 8, are inserted respectively into a longitudinal bore hole section 8.1 and pushed with a continuous bore hole onto a conductor section 9.2. By heating, the glass beads 11 and 12 are then melted to form the glass body 10 which tightly encloses the conductor 9 and also is tightly connected to the walls of the longitudinal bore hole 7 and the bore hole sections 8.1.

The volume of the glass beads 11 and 12 is chosen so that they form the glass body 10 which completely fills the interior of the housing 2 or of the housing passage with the exception of the section 7.1. To improve the adhesion of the glass body 10 to the housing 2 and to achieve even transfer and distribution of forces between the glass body 10 and the housing 2, the surfaces of the longitudinal bore hole 7 and of the bore hole sections 8.1 are profiled or roughened, for example by mechanical surface treatment, such as a material removal or cutting surface treatment with a suitable tool, by sandblasting, laser treatment, etc. or also for example by chemical surface treatment.

An essential characteristic of the bushing 1 is that the conductor sections 9.2 extend from the housing 2 opposite one another and radial to the longitudinal housing axis L, and that for this purpose the bore hole sections 8.1 are provided opposite one another in relation to the longitudinal housing axis L, resulting in a compensation of such forces that result in the use case from the pressure in the pressurized space and act on the glass body 10 in the proximity of the bore hole sections 8.1 or the openings of the housing passage formed by the bore holes 7 and 8, so that the glass body 10 is not subjected to forces acting in the longitudinal housing direction L.

The embodiment described above also results in the surface 6 on the front side 4 that is not penetrated by conductors or conductor sections, on which (surface) then the components, e.g. actuators, sensors, etc. to be provided in the pressurized space can be fastened. Due to the reduction of the external cross section of the housing 2 on the housing sections 2.3 and 2.4 and in particular also due to the fact that the conductor sections 9.2 extend for example in the proximity of the center of two opposing cross section sides of the housing section 2.4, the conductor sections 9.2 can be bent for connecting a component or assembly provided on the surface 6 so that said conductors do not protrude beyond the maximum circumference of the bushing 1.

As indicated by the broken line 6.1 in FIG. 1, the front side formed by the housing sections 2.4 can be designed otherwise, for example as a cone or conical surface, etc. for adaptation to the pressure, for transmission and/or distribution of the pressure and/or for adaptation to other requirements.

Figure 5:
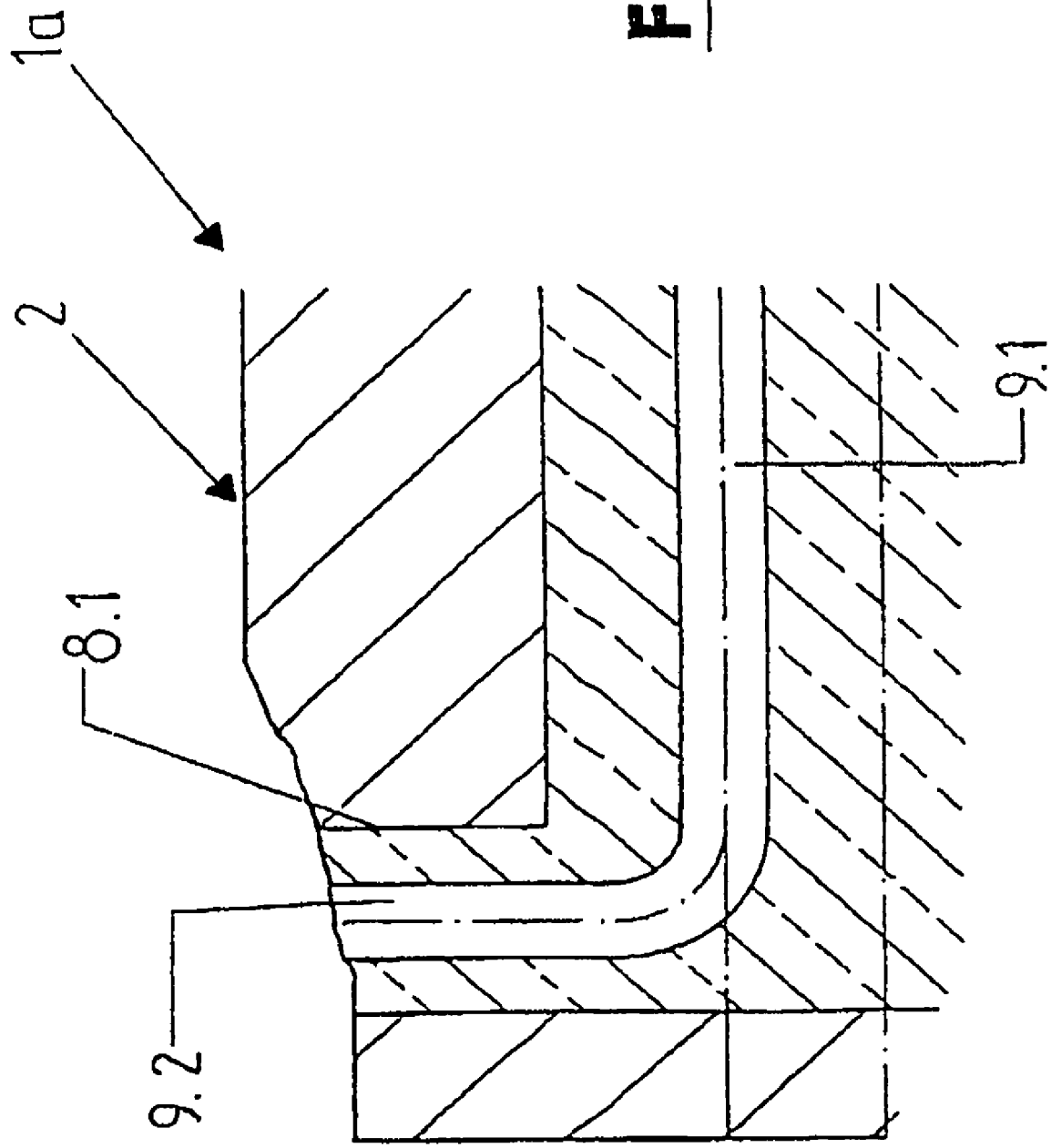
FIG. 5 is an enlarged partial representation of an opening of the housing passage in a further embodiment of the invention.

FIG. 5 shows in an enlarged partial representation a further embodiment of the bushing 1a according to the invention in the proximity of an opening or in the proximity of a bore hole section 8.1. The bushing 1a of FIG. 5 differs from the bushing 1 of FIG. 1 essentially in that the end of the conductor section 9.2 lies flush with the outer surface of the bushing formed by the insulating material or glass body.

The above description refers to bore holes 7 and 8 and bore hole sections 8.1. It goes without saying that not only bore holes or bore hole sections in the literal sense are meant, but also generally passages or channels formed in the housing 2.

REFERENCE LIST 1, 1a bushing or feedthrough
2 housing
2.1-2.4 housing section
3 back side of bushing
4 front side of bushing
5 components forming a pressurized space
6, 6.1 closed front face of housing 2
7 longitudinal bore hole
7.1 section of longitudinal bore hole 7
8 transverse bore hole
8.1 bore hole section
9 connection or conductor
9.1, 9.2 conductor section
10 glass body
11, 12 glass bead for manufacturing the glass body 10
L longitudinal housing axis

What is claimed is:

1. An electrical bushing, for pressure applications, comprising a housing with a housing passage extending at least between two housing sides at a distance from one another, at least one electrical conductor leading through the housing passage and embedded and fastened in a material that fills and tightly seals the housing passage wherein the housing passage comprises on a first housing side at least one first opening, which is provided on a section of a housing periphery extending around a housing axis (L), and the housing passage comprises at least one second opening on a second housing side, and wherein the at least first opening is oriented with an axis radial to the housing axis (L).

2. The bushing according to claim 1, wherein the housing passage comprises at least two openings on the at least one first housing side.

3. The bushing according to claim 2, wherein the at least two openings are offset at an angle around the housing axis (L).

4. The bushing according to claim 2, wherein the at least two openings on the first housing side are equal in area.

5. The bushing according to claim 1, wherein the housing passage comprises more than two openings on the first housing side.

6. The bushing according to claim 1, wherein at least the part of the housing passage extending between the at least one first and the at least one second opening is completely filled with the material tightly sealing said passage.

7. The bushing according to claim 6, wherein the housing passage is completely filled with the material tightly sealing the housing passage with the exception of a small-volume area on the second housing side.

8. The bushing according to claim 6, wherein the housing passage is profiled on at least a part of its inner surface to improve the adhesion of the material sealing the housing passage, and the housing passage is roughened or provided with a plurality of projections, in a form of at least one thread.

9. The bushing according to claim 1, wherein the axis of the at least one first opening and the at least one second openings intersects in a common point, in the housing axis (L).

10. The bushing according to claim 1, wherein a number of conductors is equal to a number of openings in the at least one first housing side.

11. The bushing according to claim 1, wherein the at least one opening in the first housing side is formed by a bore, bore hole, by a bore section or a bore hole section.

12. The bushing according to claim 1, wherein the at least one electrical conductor is angled, at a right angle or essentially at a right angle on its length extending within the housing.

13. The bushing according to claim 1, wherein the at least one electrical conductor protrudes from the housing on at least one opening of the housing passage.

14. The bushing according to claim 1, wherein the at least one electrical conductor protrudes radially or essentially radially from the housing on the first housing side in relation to the housing axis (L).

15. The bushing according to claim 1, wherein the at least one electrical conductor is flush or essentially flush with the housing on the first housing side.

16. The bushing according claim 1, wherein the housing passage is formed by longitudinal opening formed on the housing axis (L), and comprising at least one further opening into said longitudinal opening or longitudinal bore or bore hole.

17. The bushing according claim 1, wherein the material that fills and tightly seals the housing passage is a glass body.

18. The bushing according claim 1, wherein the housing is made of metal.

19. The bushing according to claim 1, wherein the housing passage is smooth on at least a part of its inner surface.

20. The bushing according to claim 1, wherein the housing passage comprises a single opening on the second housing side.

21. The bushing according to claim 1, wherein the housing forms a closed front surface on the first housing side for accommodating electrical or mechanical components.

22. The bushing according to claim 21, wherein the closed front surface is flat and lies in a plane that is perpendicular to the housing axis.

23. The bushing according to claim 21, wherein the closed front surface is three-dimensional, as a rotation surface enclosing the housing axis (L).

24. The bushing according to claim 1, wherein the first housing side is the housing side to which pressure is applied.

25. The bushing according to claim 1, wherein the housing is sleeve-shaped on at least part of its length or is rotationally symmetrical to the housing axis (L) on its circumferential surface.

26. The bushing according to claim 1, wherein said bushing is part of an electric or electro-mechanical component, an electric or electro-mechanical component that is subjected to high pressure, or a high-pressure sensor.

27. The bushing according to claim 1, wherein the first housing side encloses the housing axis (L).

28. A method for manufacturing an electrical bushing for pressure applications, comprising a housing with at least one housing passage, at least one electrical conductor extending through the housing passage and protruding at both ends from the housing from a respective opening of the housing passage on two housing sides at a distance from one another, said at least one electrical conductor being embedded and fastened in a material that forms a glass body and fills and tightly seals the housing passage whereby the housing being provided with the at least one housing passage, which is formed by at least one second bore or bore hole extending in a housing axis (L), and by at least one first bore hole opening into said second bore or bore hole and executed radially or essentially radially to the housing axis (L), by inserting the at least one conductor made of an electrically conductive material so that the conductor is accommodated with a partial length in the second bore or bore hole and with a further angled partial length in the first bore or bore hole, by inserting at least one glass bead in the holes, respectively and by melting the glass beads to form the glass body.

29. The method according to claim 28 wherein the at least one electrical conductor is inserted so that it protrudes with at least one end from the housing.

30. The method according to claim 28, wherein the at least one electrical conductor is inserted so that at least one end of the conductor lies flush or essentially flush with an outer surface of the housing.

31. The method according to claim 28, wherein the number of conductors inserted into the housing is chosen so that at least one conductor is accommodated with its further partial length in each first bore or bore hole.

32. The method according to claim 28, wherein at least part of the glass beads are strung onto the at least one electrical conductor.

33. The method according to claim 28, wherein the at least one first bore or bore hole is formed by a transverse hole.

34. The method according to claim 28, wherein the at least one second bore or bore hole is a longitudinal bore or bore hole.

* * * * *

UNITED STATES PATENT AND TRADEMARK OFFICE
CERTIFICATE OF CORRECTION

| | | |
|---|---|---|
| PATENT NO. | : 8,013,260 B2 | Page 1 of 1 |
| APPLICATION NO. | : 12/311744 | |
| DATED | : September 6, 2011 | |
| INVENTOR(S) | : Hartl | |

It is certified that error appears in the above-identified patent and that said Letters Patent is hereby corrected as shown below:

Column 5, line 14, cancel the text beginning with "9. The bushing" to and ending "axis (L)." in column 5, line 16, and insert the following claim:

--9. The bushing according to claim 1, wherein the axis of the at least one first opening and the at least one second opening intersects in a common point, in the housing axis (L).--

Signed and Sealed this
Twenty-second Day of November, 2011

David J. Kappos
*Director of the United States Patent and Trademark Office*